United States Patent
Klingler

[15] 3,677,650
[45] July 18, 1972

[54] APPARATUS FOR ACCUMULATING AND DISPLAYING FINE PARTICLES IN A GAS

[72] Inventor: George A. Klingler, 300 Patterson Road, Dayton, Ohio 45419

[22] Filed: June 28, 1971

[21] Appl. No.: 157,136

[52] U.S. Cl. ............................................................356/103
[51] Int. Cl. ........................................................G01n 21/00
[58] Field of Search....................356/103, 104, 196, 197, 198

[56] References Cited

UNITED STATES PATENTS 2,681,590  6/1954  Fleming................................356/103

Primary Examiner—Ronald L. Wibert
Assistant Examiner—V. P. McGraw
Attorney—Harry A. Herbert, Jr. et al.

[57] ABSTRACT

A particle accumulator display having a closed transparent chamber with a plurality of input nozzles to provide a vortex flow within the chamber. An ejection nozzle is centrally located within the chamber at the end adjacent the input nozzles. The input nozzles and ejection nozzles are spaced apart with an approximately bell shaped flow stabilizer being positioned between them. The chamber is enclosed in a light tight housing with a viewing eyepiece positioned at the end remote from the input and ejection nozzles, and a second eyepiece adapted to be adjustably positioned around the chamber. A light is provided to illuminate particle columns accumulated within the chamber.

6 Claims, 11 Drawing Figures

Patented July 18, 1972
3,677,650
5 Sheets-Sheet 1
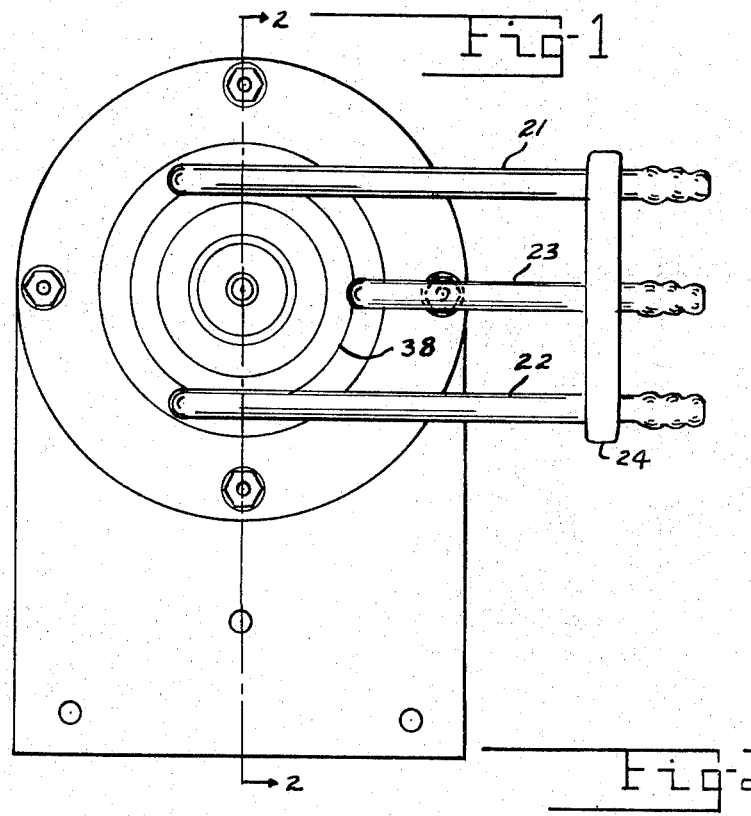
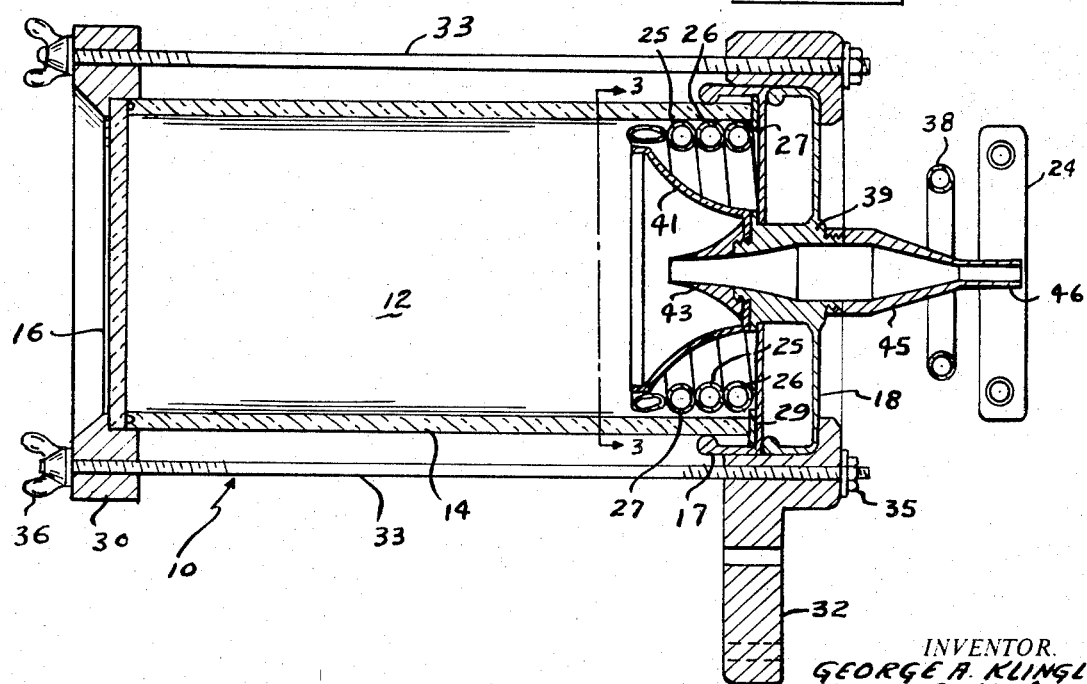
INVENTOR.
GEORGE A. KLINGLER
BY Harry A. Herbert Jr.
ATTORNEY
Richard J. Killoren
AGENT

INVENTOR.
GEORGE A. KLINGLER

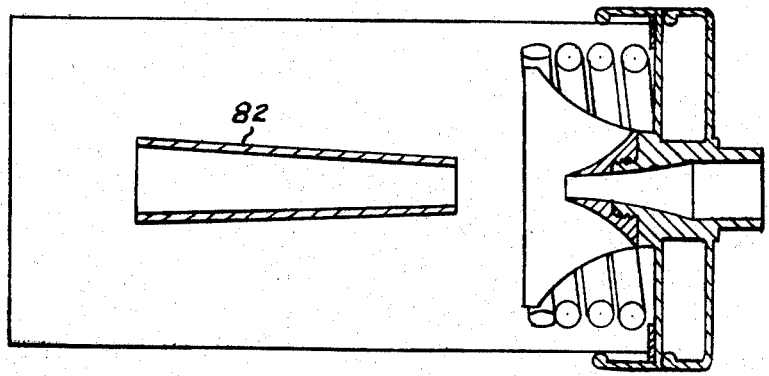
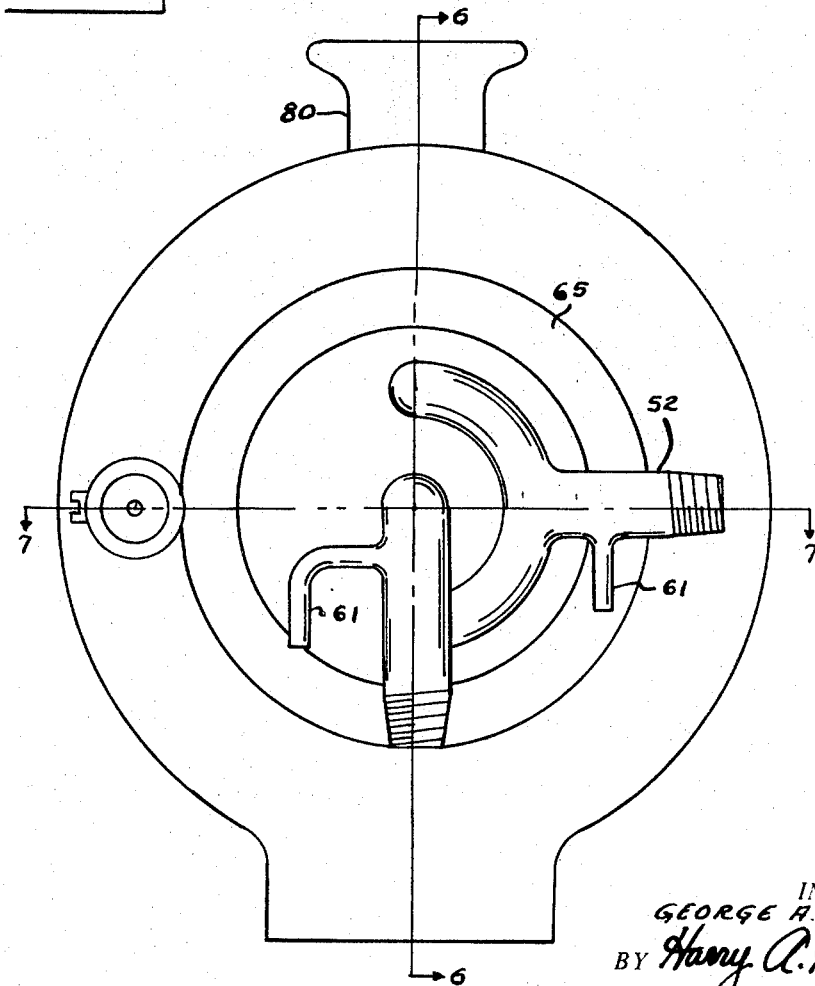

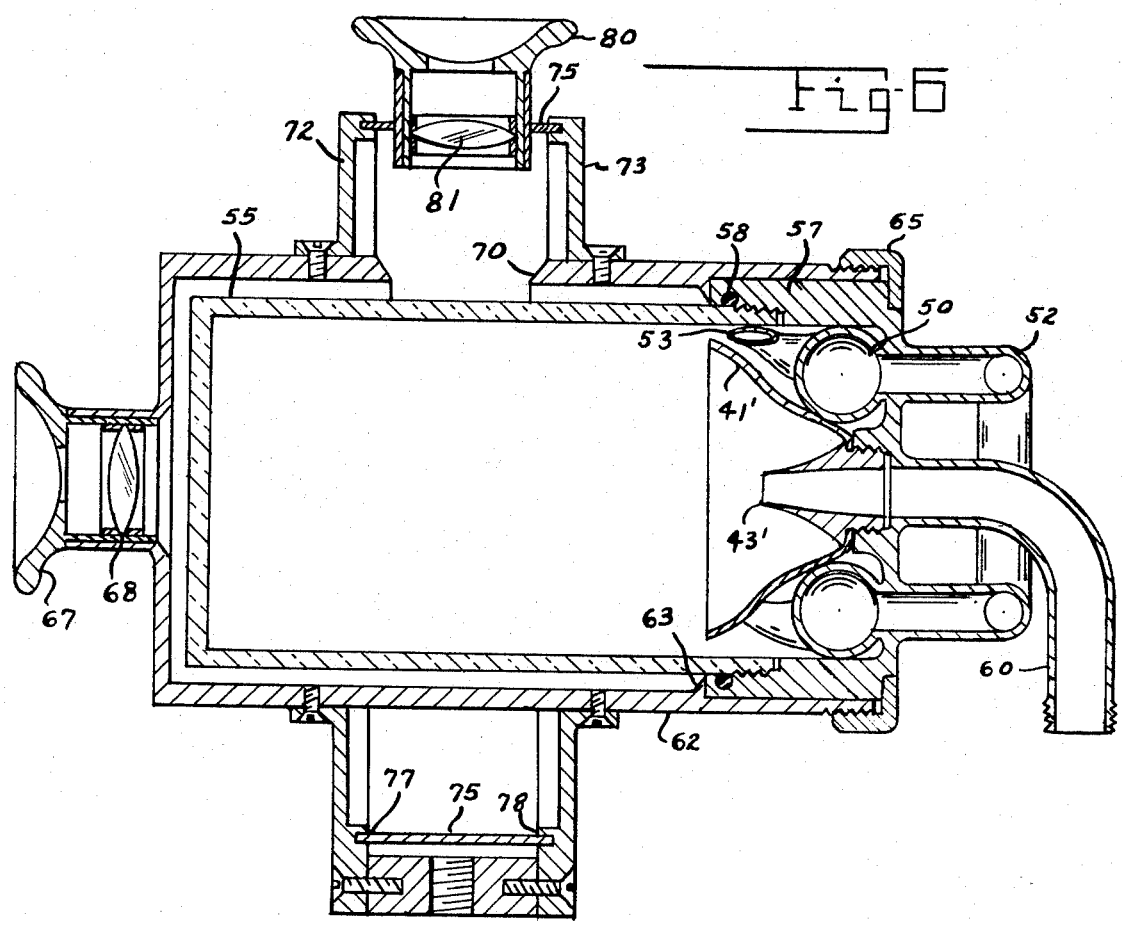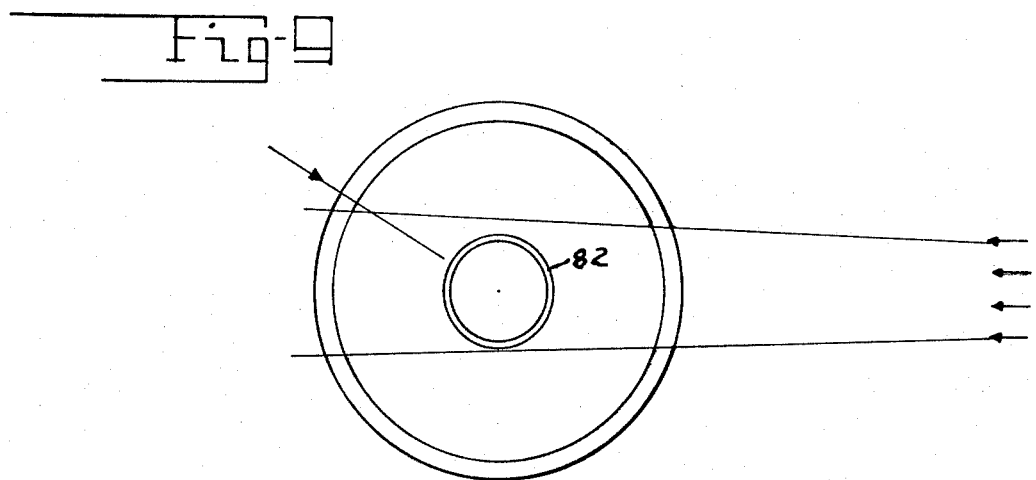

Patented July 18, 1972
3,677,650
5 Sheets-Sheet 5
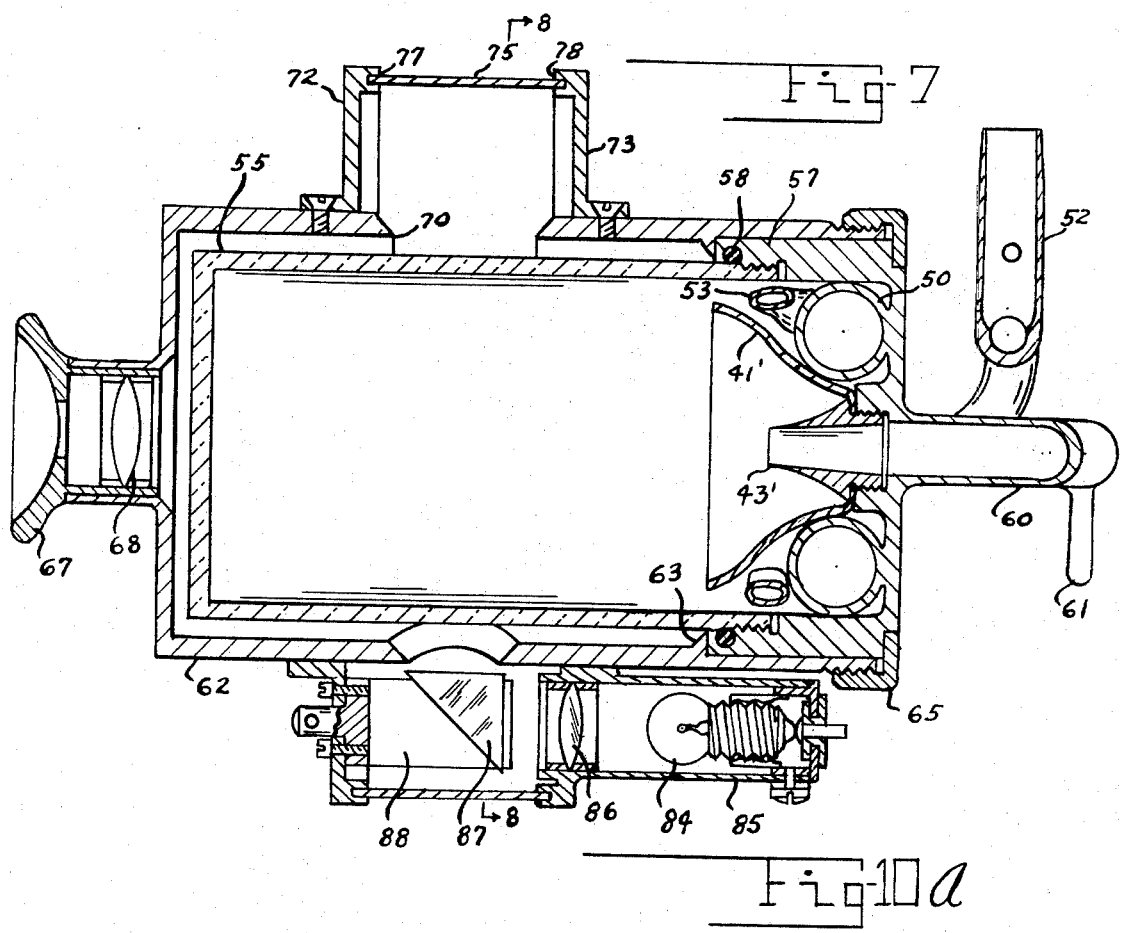
Fig. 7
Fig. 10a
Fig. 10b
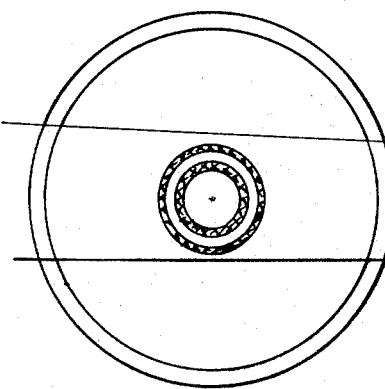
INVENTOR.
GEORGE A. KLINGLER
BY *Harry A. Herbert Jr.*
ATTORNEY
*Richard J. Killoren*
AGENT

APPARATUS FOR ACCUMULATING AND DISPLAYING FINE PARTICLES IN A GAS

BACKGROUND OF THE INVENTION

It is sometimes desirable to accumulate and retain a sample of fine and ultra fine particles that exist in a fluid media. For example, it may be desirable to accumulate the contaminants in the air of clean and white rooms to assist in the monitoring and control of the air in the room. Also, in environmental control, it is desirable to detect and display aersols.

BRIEF SUMMARY OF THE INVENTION

According to this invention, a gas, containing the fine or ultra fine particles to be accumulated, is supplied to a closed transparent chamber through injection nozzles to provide a peripheral tangential injection of the gas into the chamber to provide a vortex flow within the chamber. A fluid ejection nozzle is positioned centrally within the chamber. The ejection nozzle is spaced from the injection nozzles with a flow pressure stabilizer being positioned between them. The apparatus differs from the conventional centrifugal particle separator in that there is no exit port for the separator particles, and in that the injection nozzles are spaced from the ejection nozzle by the flow stabilizer which permits the formation of one or more annular columns of separated particles. Apparatus is also provided for illuminating and viewing the columns of separated particles.

IN THE DRAWINGS

FIG. 1 is an end view of a particle accumulator according to the invention.

FIG. 2 is a sectional view of the device of FIG. 1 along the line 2—2.

FIG. 4 is a schematic illustration showing an annular swirl column, such as may be produced in the device of FIG. 1.

FIG. 5 is an end view of a modified particle accumulator with a viewing attachment.

FIG. 6 is a sectional view of the particle accumulator of FIG. 5 along the line 6—6.

FIG. 7 is a sectional view of the particle accumulator of FIG. 4 along the line 7—7.

FIG. 9 is a schematic view showing the illumination for the annular swirl column for the device of FIG. 5.

FIG. 10A shows one image as viewed in the peripheral eyepiece.

FIG. 10B shows one image viewed through the on AXIS eyepiece.

DETAILED DESCRIPTION OF THE INVENTION

Figure 8:
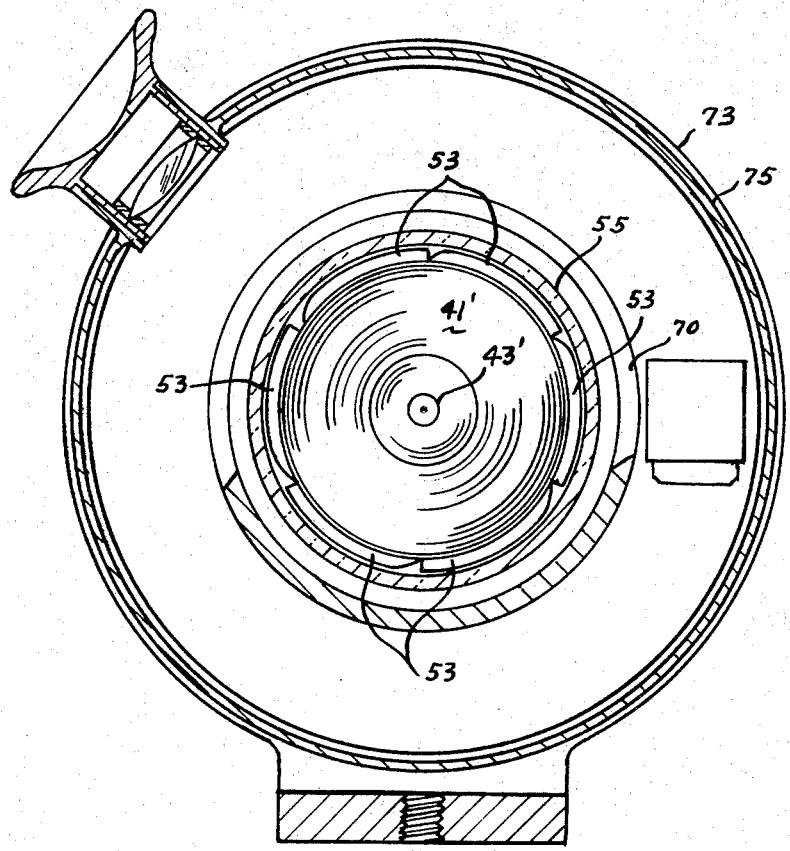
FIG. 8 is a sectional view of the device of FIG. 5 taken along the line 8—8 of FIG. 7.

Reference is now made to FIGS. 1 and 2 of the drawings, wherein a particle accumulator 10 has a closed chamber 12 formed by a cylindrical member 14 with a window member 16 at one end. The other end of chamber 12 is closed with double lid members 17 and 18. Three tubes 21, 22 and 23, held by spacer 24, pass through holes in lids 17 and 18 and are formed into coils 25, 26 and 27 within the chamber 12. The tips of coils 25, 26 and 27 are flatened, as shown at 28 in FIG. 3, to form elongated exit slots. The members 14, 16, 17 and 18 are held together by frame member 30 and support member 32, which are secured by threaded rods 33 and nuts 35 and 36. The support member 32 may be secured to a bracket or stand, not shown. A ring member 38 provides added rigidity for tubes 21, 22 and 23.

Figure 3:
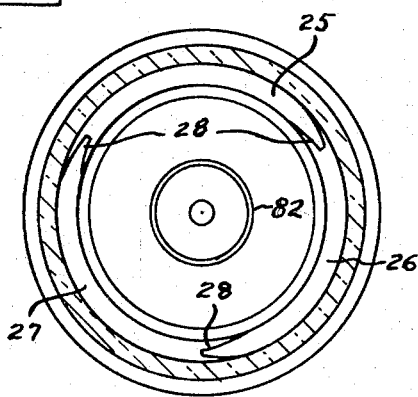
FIG. 3 is a sectional view of the device of FIG. 2 along the line 3—3.

The lid member 18 has a central portion 39 threaded at both ends. A substantially conical shaped flow stabilizer 41 is secured to the portion 39 by the ejection nozzle 43, which is threaded onto portion 39. A tapered output member 45 is threaded to the other end of portion 39 and has a portion 46 to which an air or vacuum hose is attached. In the operation of the device, air under pressure is applied to the inlet of tubes 21, 22 and 23 so that a vortex flow is generated in chamber 12 and air is forced to exit through ejection nozzle 43. If the ends of tubes 21, 22 and 23 are left open and a suction is applied to part 46, air will be drawn into the open tubes 21, 22 and 23. Any dust contained in the air will be carried into the flow chamber and take part in the vortex flow, and thus be exposed to pressure and flow gradients and the centrifugal field created by the vortex motion, and be collected into columns as shown in FIGS. 3, 9 and 10. In both modes of operation, pressure or vacuum, essentially the same flow and pressure distribution is created inside the chamber, except for the difference of being above atmospheric pressure in the former and below in the latter. Obviously, what mode of operation to use is a matter of convenience and depends, most of all, on the type of fluid to be separated. For separation of dust from the air, the vacuum mode would be most convenient to use.

A possible explanation for the separation mechanism is as follows. In either mode of operation, when air or any other fluid is subject to entering the chamber through the three tangentially arranged nozzles, the fluid in the chamber, which is being continuously replenished throughout the time of operation of the device, is very quickly set in motion around the chamber axis of symmetry and establishes and equilibrium condition for a constant flow rate.

The fluid upon entering the chamber through the injection nozzles forms a relatively thin layer and moves in a spiral motion around and along the chamber wall adding momentum to the fluid present in the chamber while proceeding along the chamber wall until the flow arrives at the opposite end. The flow then changes direction and flows around and inward in a spiral motion toward the center of the front window, where the fluid is forced to change direction again to a flow concentrated around and along the axis of symmetry towards and through the ejection nozzle on its way out of the chamber. This type of fluid motion and flow is known as vortex flow, having forced vortex motion in a narrow cross section along and around the chamber axis of symmetry, a transition region adjacent to this region, where the tangential velocity and consequently the centrifugal force reaches a maximum, and a region of free vortex motion between the transition region and the chamber wall. In this flow, starting with the injection, the fluid undergoes a change in pressure, being highest at the point of injection and along the chamber wall toward the front window where the pressures starts to decrease noticably, being lowest at and along the chamber axis of symmetry. Along with this pressure change the tangential velocity changes also, being inversely proportional to the radial distance in the free vortex region, but increases linearly with radial distance in the forced vortex region. In the flow around and down the front window towards the center of the chamber, the flow has to overcome the increasing centrifugal force created by the rotation imparted to the fluid, and while flowing around and along the axis of symmetry on the way toward the ejection nozzle, the fluid is continuously being acted upon by both shear and centrifugal forces, which are being continuously maintained by the injection of new fluid. Also, associated with this flow are boundary layers, which effect the chamber flow characteristic, and turbulence causing imperfections in the desired flow behavior. A boundary layer forms along the chamber wall and around and down the window, thinning out toward the center. Also, along the around the free vortex a boundary layer develops, starting at the injection area and extending down a portion adjacent to the window, having fluid flowing in between and then extending along the inside toward the flow stabilizer. Adjacent to this boundary layer inside the free vortex, fluid flows in spiral motion and axial direction toward the ejection nozzle causing another boundary layer to form along the forced vortex starting near the window and extending with rapidly increasing tangential and axial velocity to the vicinity of the ejection nozzle. The are in between and immediately around these two boundary layers comprise the transition region where the most efficient and effective separation takes place.

In the present invention, this transition region is located in an annular region around and along the axis of symmetry, with its inside radius being larger than the radius of the entrance to the ejection nozzle. This chamber characteristic is brought about by a modification of the free vortex region, inasmuch as this region has no, or only weak, axial flow movements, and all energy used in this region is transferred into rotational motion of the fluid around the axis of symmetry as a result of the bell-shaped flow stabilizer in conjunction with the immersed ejection nozzle. Due to these conditions, a strong discontinuity is established between the free vortex and the forced vortex region resulting in a transition region having strong shear action between the rotating free vortex, having negligible axial motion, and the high velocity forced vortex flowing through the center of this region toward and through the ejection nozzle. This type of flow, in effect, will cause strong radial density gradients near and around the axis of symmetry and particularly in the transition region. Due to the centrifugal forces, all particulate matter entrained in the air entering this region will be separated to the adjacent area of somewhat larger radii where the shear forces create microscopic size vortices entrained with particulates having their axis of rotation in a plane perpendicular to the chamber axis of symmetry around the forced vortex core in the transition region. These vortices, and the particles making up the vortices, move at the same rotational velocity as the core or the adjacent area, but in addition will intermittently attain much higher rotational velocities around their own axis and consequently be exposed to higher centrifugal forces than the fluid in the core and in the transition region, due to interaction of their much smaller diameter with the fast viscous sheet-like throughflow. These interactions cause the vortices to move back and forth in the transition region in an axial direction at a high rate of spin around their own axis, while gaining strength and building up in density due to rapid particle growth by accumulation of mass due to the confinement. In these interactions, vertices move about and oftentimes collide and combine due to changes in their spin velocity when being forced to different radii. Interposed between vortice sheets in the transition region can be annular flow channels, void of particles, but carrying fluid at high tangential and axial flow velocities, thereby keeping the vortices spinning by frictional energy exchange. Adjacent to flow channels, vortices can have opposing direction of spin and movement therefore favoring collision and rapid accumulation. In addition, conditions may arise and exist where vortices may alternately reinforce each other causing very rapid particle growth. Vortice sheets interlaced with flow channels can establish themselves as the cross section of the forced vortex becomes somewhat restricted due to particle accumulation and pressure changes in the transition region.

Even though the initial and major separation and accumulation takes place in the transition region, as the particle size grows and accumulation increases, annular vortices form and grow in size and, due to the centrifugal field, can be forced out of the transition region and accumulate adjacent to this region in the free vortex region where confinement can take place just the same. Initial particle separation and accumulation as it will appear in the chamber is shown in FIG. 4. This FIGURE depicts separation and accumulation of particles smaller than 0.1 micron entrained in the air entering the chamber through the injection nozzles. On close examination, the annular column, under certain conditions, may be found to be composed of several closely spaced vortex sheets due to particle size and chemical composition and other influences.

While, for certain applications, the columns produced in the device of FIGS. 1–4 may be viewed directly, an apparatus for detection of the light scattering properties of the particles is shown in FIGS. 5–8. These FIGURES also show another possible configuration for the particle accumulator, In this device, particle laden gas is supplied to an annular manifold 50 through a somewhat Y shaped inlet tube 52. Six nozzles 53 are secured to manifold 50. Nozzle 43' and flow stabilizer 41' are similar to those shown in FIG. 1. A transparent cylindrical chamber 55, closed at one end, is threaded into an end member 57 and sealed with an O-ring 58. An output tube 60 is connected to end member 57. Pressure taps 61 are shown on the input and output tube. A light tight housing 62 surrounds chamber 55 and has a stop 63 which abuts end member 57. A ring member 65 secures the housing 62. A viewing eyepiece 67 with a conventional lens 68 is secured to the end of housing 62. A cut out portion 70 in housing 62 is enclosed by flanges 72 and 73 which are secured to the housing 62. A short tubular section 75 rides in grooves 77 and 78 in the flange members 72 and 73 and close the housing. An eyepiece 80 with a lens 81 is secured to the tubular section 75. The section 75 is slidable in grooves 77 and 78 to permit movement of the eyepiece 80 around the periphery of the housing 62. The annular column 82 collected in the chamber 55 is illuminated, as shown in FIG. 9, by a light from a source 84 in housing 85 by means of a lens 86 and a 90° prism 87 mounted on prism support 88.

The operation of the particle accumulator is substantially as described above. The formation of the particle columns and light scattering properties can be observed through eyepieces 67 and 80. The image seen in eyepiece 80 may be as shown in FIG. 10A, and the image seen in eyepiece 67 may be as shown in FIG. 10B. In one test, with a suction pump connected to the output tube 60, room air was sucked into the accumulator. A pressure gage was connected to the output tube tap 61. With the gage reading −10 inches, it took one minute for a visible swirl column to form. The density of the column kept slowly increasing. Photo detectors may be substituted for the eyepiece for some applications.

There is thus provided an apparatus for accumulating and viewing fine particles carried by a gas.

I claim:

1. A particle accumulator comprising a closed transparent chamber; means including a plurality of input nozzles, for providing a vortex flow of particle laden gas within the chamber; a gas ejection nozzle spaced from and centrally located adjacent the input nozzles; means positioned between the input nozzles and the ejection nozzle, for stabilizing the flow within the chamber to permit at least one annular column of particles to accumulate within said chamber.

2. The device as recited in claim 1 in combination with a light tight housing surrounding said chamber; means within the light tight housing for illuminating the annular columns of particles; a first means for viewing the end of said annular columns and a second means adjustably positioned around the periphery of said housing for viewing the radial light scattering effects of the columns.

3. The device as recited in claim 2 wherein the means for viewing the end of the columns is an eyepiece with a lens centrally located at the end of the housing.

4. The device as recited in claim 3 including a pair of annular flanges secured to said housing; said flanges having annular grooves; a tubular member slidably positioned in said grooves; said second viewing means includes an eyepiece with a lens extending through and secured to said tubular member whereby the eyepiece can be adjustably positioned around the periphery of said housing.

5. The device as recited in claim 4 wherein said means for stabilizing the flow within said chamber is a bell shaped member attached to the ejection nozzle.

6. The device as recited in claim 1 wherein the means for stabilizing the flow within said chamber is a bell shaped member attached to the ejection nozzle.

* * * * *